(No Model.)

H. C. BONIFACE.
MANUFACTURE OF JEWELRY.

No. 296,118. Patented Apr. 1, 1884.

WITNESSES:
Jos. H. Rosenbaum.
Martin Petry.

INVENTOR
Henry C. Boniface
BY
Jaques & Raegener
ATTORNEYS.

N. PETERS. Photo-Lithographer. Washington, D. C.

UNITED STATES PATENT OFFICE.

HENRY C. BONIFACE, OF NEW YORK, N. Y., ASSIGNOR TO RICE & BROTHER, OF SAME PLACE.

MANUFACTURE OF JEWELRY.

SPECIFICATION forming part of Letters Patent No. 296,118, dated April 1, 1884.

Application filed February 21, 1884. (No model.)

*To all whom it may concern:*

Be it known that I, HENRY C. BONIFACE, of the city, county, and State of New York, have invented certain new and useful Improvements in the Manufacture of Jewelry, of which the following is a specification.

This invention has reference to improvements in the manufacture of rubber or other jewelry, whereby a large variety of different articles can be produced, such as bracelets, breast-pins, and the like; and the invention consists in cutting a series of transverse recesses into a tube of rubber or other material, then bending said tube into the shape of the article to be produced.

The invention consists, secondly, of an article of jewerly formed of a continuous foundation portion and a series of narrow ring-shaped strips separated by intermediate recesses.

Figure 1:
Figure 2:
Figure 3:
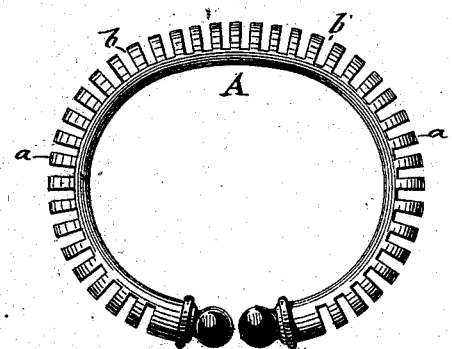
Figure 4:
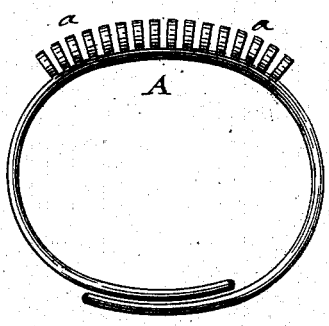
Figure 5:
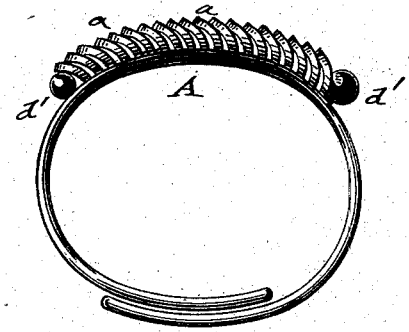
Figure 6:

In the accompanying drawings, Figure 1 represents a side view of a tube of rubber or other suitable material, used for making my improved articles of jewelry. Fig. 2 shows the tube with a series of transverse recesses. Fig. 3 shows a side view of a bracelet made from said transversely-recessed tube. Figs. 4 and 5 are side views of different designs of bracelets, and Figs. 6 and 7 a front and top view of a breast-pin made according to my invention.

Similar letters of reference indicate corresponding parts.

Figure 7:
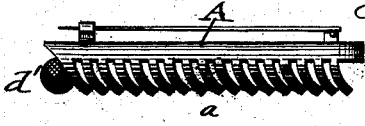

In carrying out my invention, a tube, A, of hard rubber, metal, or other suitable material, and of round, oval, or other cross-section, is cut transversely to its axis by means of a circular saw, or, preferably, by a gang of circular saws or burrs, so that a series of recesses, $b$, are formed, which alternate with intermediate narrow ring-shaped strips or bands $a$. The recesses or strips may be wider or narrower, as required for the articles to be made therefrom. The recessed tube A is either bent into the form of a bracelet, as shown in Fig. 3, and provided with solid end tops, $d$, or it may be cut into smaller pieces and used for breast-pins or other articles of jewelry having the same characteristics as the bracelet. By thus cutting transversely through a portion of the tube a continuous foundation portion is retained, which forms when bent the elastic spring portion of the bracelet, so that the same can be readily slipped on or off the wrist. In some cases the narrow strips $a$ may be retained only at the face of the bracelet or other article, and cut away at the ends of the same, as shown in Figs. 4 and 5. By bending over the narrow strips $a$ into sidewise-inclined position, and providing the ends of a series of strips, $d'$, as shown in Figs. 5 and 7, bracelets, breast-pins, and other articles of ornamental appearance are obtained. By thus transversely recessing the tubes a size of tubes may be used for bracelets which, without the recesses, would be too rigid for use.

Having thus described my invention, I claim as new and desire to secure by Letters Patent—

1. The method herein described of making rubber and other jewelry, which consists in cutting a series of transverse recesses into a tube of suitable material, and then bending the continuous foundation portion into the proper shape, substantially as set forth.

2. An article of jewelry formed of a continuous foundation portion, and of a series of narrow ring-shaped strips, separated by intermediate transverse recesses, said strips being arranged along a part or the entire length of the article, substantially as set forth.

In testimony that I claim the foregoing as my invention, I have signed my name in presence of two subscribing witnesses.

HENRY C. BONIFACE.

Witnesses:
GEORGE W. SEARS,
SOLOMON HOCHSTER.